Figure 1:
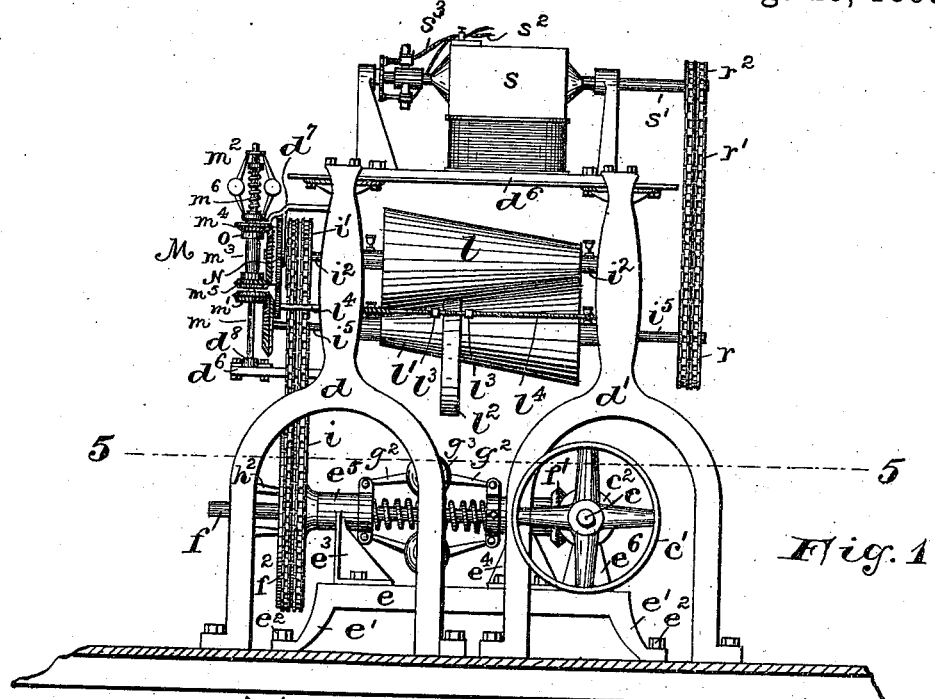

(No Model.) 5 Sheets—Sheet 1.

M. MOSKOWITZ & S. YOUNG.
MEANS FOR TRANSMITTING POWER FROM CAR AXLES TO DYNAMOS.

No. 504,132. Patented Aug. 29, 1893.

WITNESSES:
Wm. H. Camfield Jr.
H. Utmarsl

INVENTORS:
Morris Moskowitz
and
Samuel Young,
BY Fred'k C. Fraentzel, ATT'Y.

(No Model.) 5 Sheets—Sheet 3.

M. MOSKOWITZ & S. YOUNG.
MEANS FOR TRANSMITTING POWER FROM CAR AXLES TO DYNAMOS.

No. 504,132. Patented Aug. 29, 1893.

WITNESSES:
Wm. H. Canfield, Jr.
A. N. Marsh

INVENTORS:
Morris Moskowitz
and
Samuel Young,
BY Fred H. Fraentzel, ATT'Y.

(No Model.) 5 Sheets—Sheet 4.
M. MOSKOWITZ & S. YOUNG.
MEANS FOR TRANSMITTING POWER FROM CAR AXLES TO DYNAMOS.
No. 504,132. Patented Aug. 29, 1893.
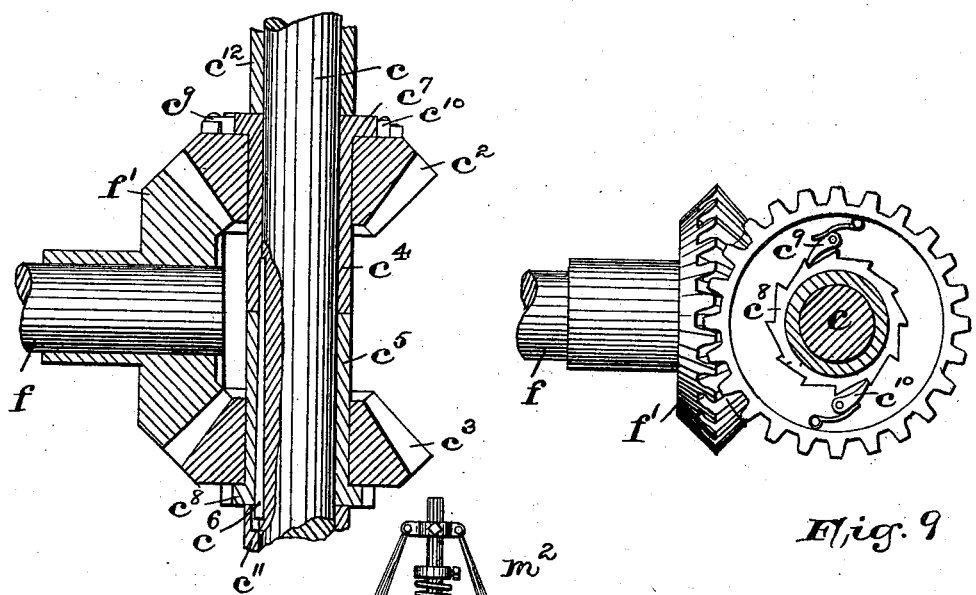
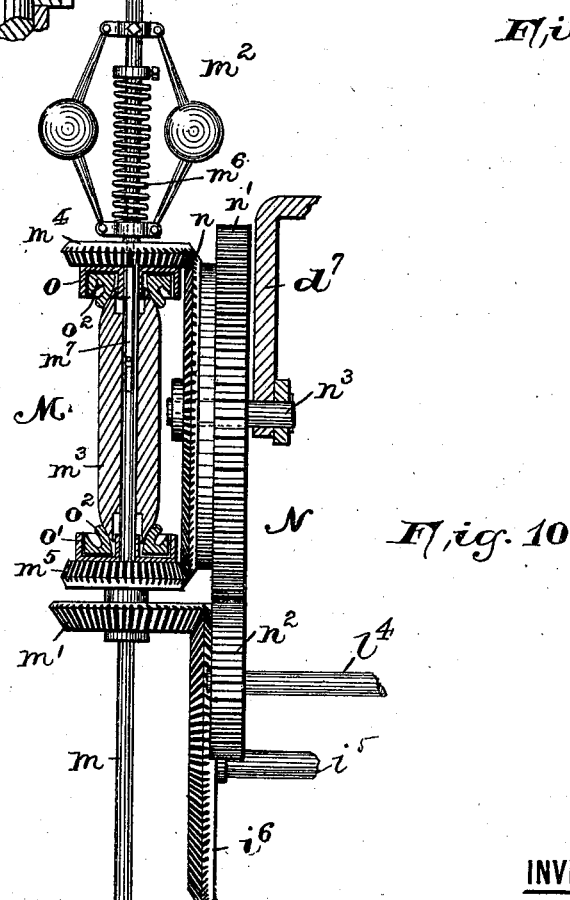
WITNESSES:
INVENTORS:
Morris Moskowitz
and
Samuel Young,
BY Fred H. Fraentzel ATT'Y.

(No Model.) 5 Sheets—Sheet 5.
M. MOSKOWITZ & S. YOUNG.
MEANS FOR TRANSMITTING POWER FROM CAR AXLES TO DYNAMOS.
No. 504,132. Patented Aug. 29, 1893.
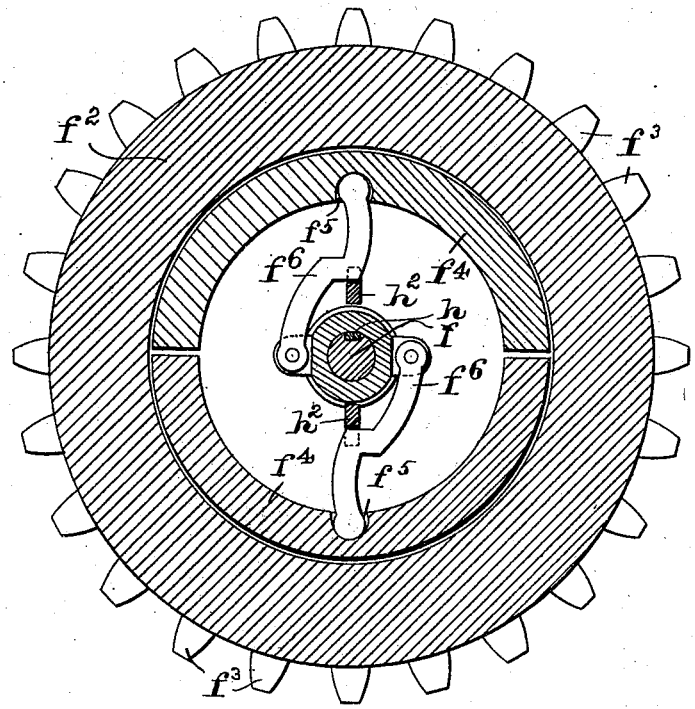
Fig. 6ª
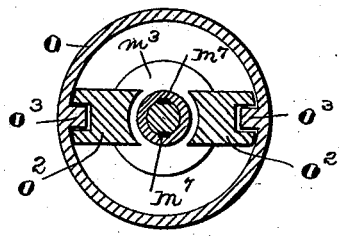
Fig. 10ª
WITNESSES:
Wm. H Camfield Jr
H W Marsh
INVENTORS:
Morris Moskowitz
and
Samuel Young,
BY Fred C. Fraentzel, ATT'Y.

UNITED STATES PATENT OFFICE.

MORRIS MOSKOWITZ AND SAMUEL YOUNG, OF NEWARK, NEW JERSEY ASSIGNORS OF ONE-HALF TO LEON D. ADLER AND JOSEPH LOEWENBERG, OF SAME PLACE.

MEANS FOR TRANSMITTING POWER FROM CAR-AXLES TO DYNAMOS.

SPECIFICATION forming part of Letters Patent No. 504,132, dated August 29, 1893.

Application filed April 29, 1893. Serial No. 472,317. (No model.)

*To all whom it may concern:*

Be it known that we, MORRIS MOSKOWITZ and SAMUEL YOUNG, citizens of the United States, residing at Newark, in the county of Essex and State of New Jersey, have invented certain new and useful Improvements in Means for Transmitting Power from a Car-Wheel Axle to a Dynamo in the Car; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

In Letters-Patent of the United States, granted to us June 6, 1893, and numbered 498,985, we have illustrated and claimed a novel form of mechanism for transmitting power from a car-wheel axle, when the car is in transit, to a dynamo within the car to generate electricity. In this application, it is our intention to illustrate and claim a novel form of speed regulating device adapted to be used in connection with any suitable form of mechanism operated from the car-wheel axle, said speed regulating device thereby being adapted to operate the dynamo within the car, whereby the dynamo is successfully connected with the car-wheel axle to maintain an equal power and uniform speed of the dynamo, regardless of the speed at which the train may be traveling, and at all times to cause the dynamo to run in the same direction, whether the car is moving forward or backward.

The invention therefore consists in the novel form of speed regulator, to be hereinafter more fully described and finally embodied in the clauses of the claim, by means of which the rotary movement of the armature shaft of the dynamo is maintained constant; and the invention further consists in the combination of this speed regulator with suitable means for operating the same from a car-wheel axle.

The object of the invention therefore resolves itself into the obtaining from the variable speed of the car-wheel axle, a constant and uniform speed of the dynamo.

The invention is illustrated in the accompanying sheets of drawings, in which—

Figures 2, 3:
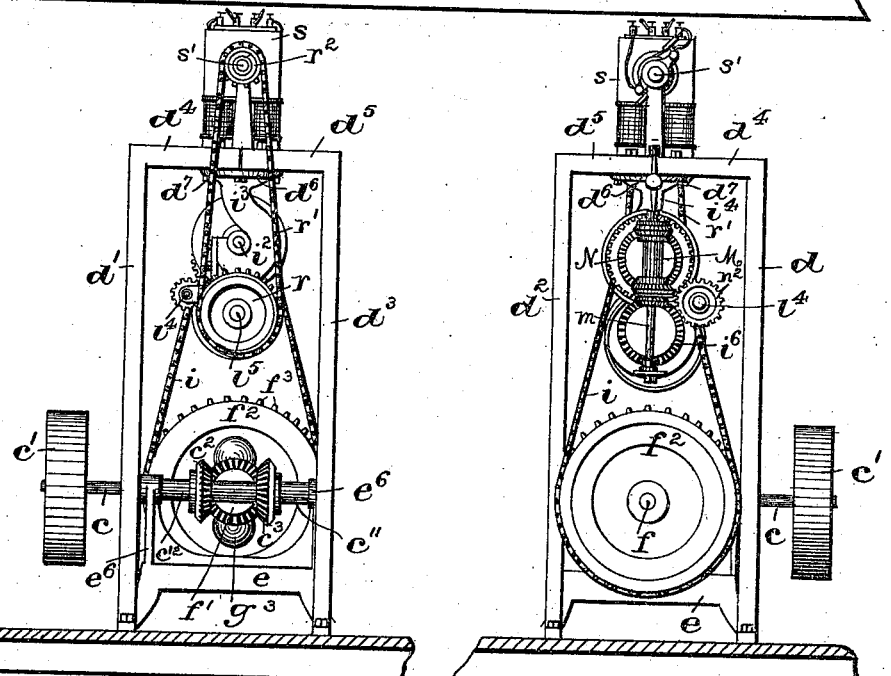
Figure 4:
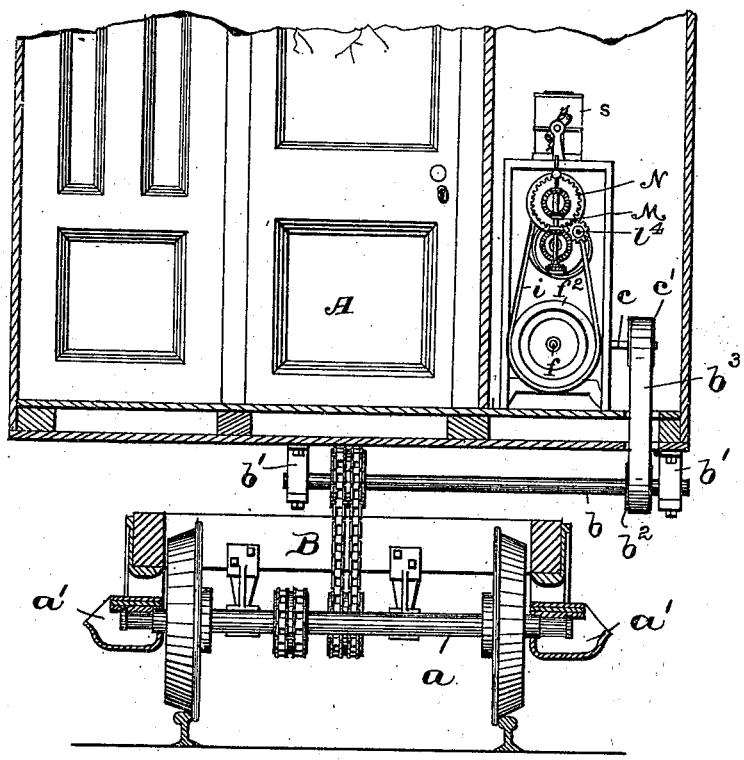
Figure 5:
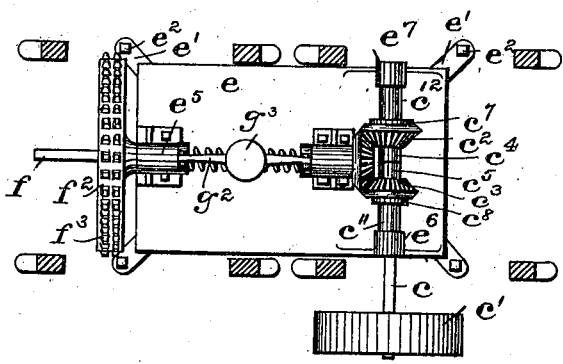
Figure 6:
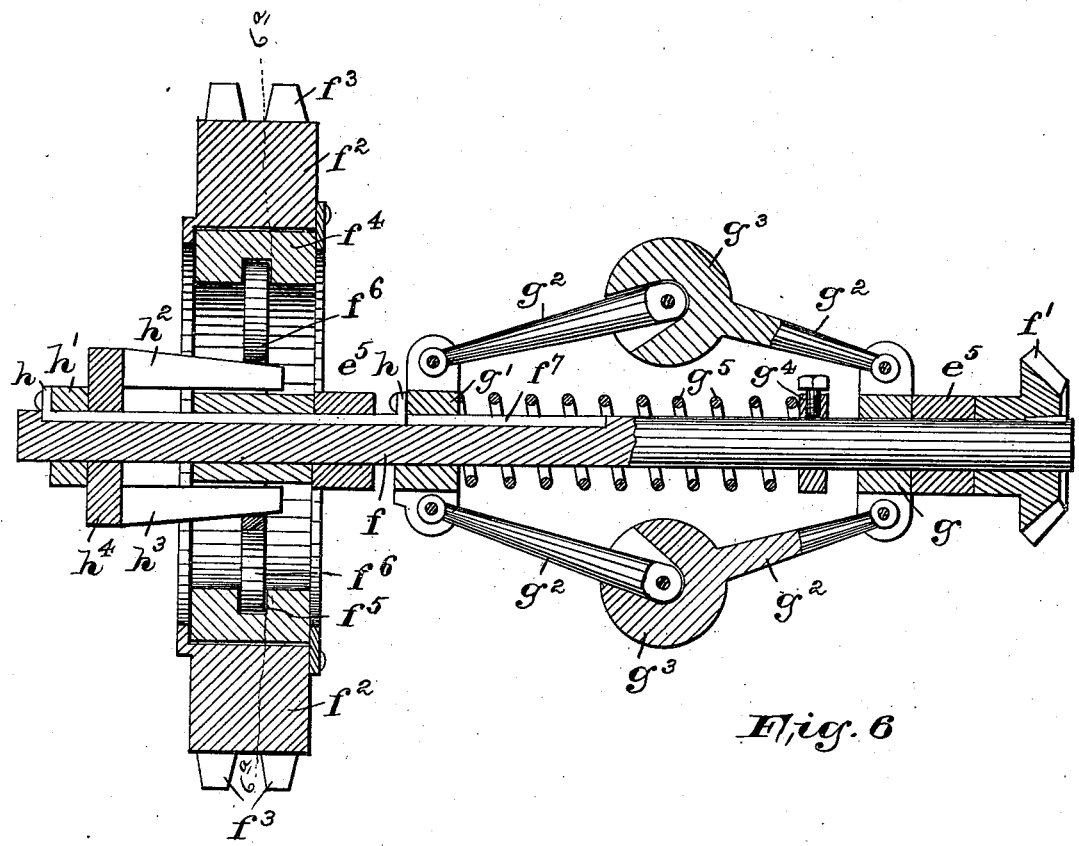
Figure 7:
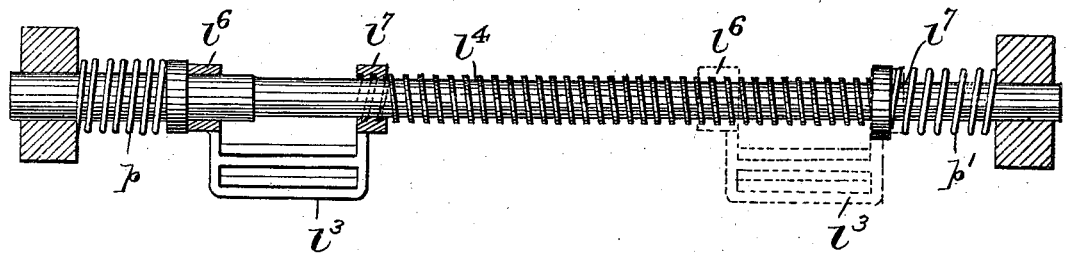

Figure 1 is a front elevation of our novel form of speed regulator, and Figs. 2 and 3 are the respective end views of the speed regulating device. Fig. 4 is a cross section of one end of a railway car, illustrating in position therein, our novel form of speed regulating device connected with a dynamo and one form of gearing connected with the car-wheel axle, for communicating the rotary motion of the car-wheel axle to said speed regulator within the car. Fig. 5 is a horizontal section of the speed regulator, taken on line 5—5 in Fig. 1. Fig. 6 is a detail view of a governor and its connecting parts, used in connection with the machine illustrated in said Figs. 1, 2 and 3, and Fig. 6$^a$ is a vertical section taken on line 6$^a$—6$^a$, in said Fig. 6. Fig. 7 is an enlarged detail view of a screw-threaded rod having a follower thereon to be provided with a strap adapted to be connected with the speed regulator. Fig. 8 is an enlarged sectional view of a system of clutch gears connected with the shaft of the governor illustrated in said Fig. 6, for causing the rotary motion of said shaft in one direction, irrespective of the forward or backward movements of the car truck and its car-wheel axle, and Fig. 9 is an end view of said clutch gearing. Fig. 10 is an enlarged sectional view of a speed-regulating governor used in connection with the machine illustrated in Fig. 1, geared with one of the shafts of the cone-pulleys illustrated therein, and by means of a suitable system of gearing causing the reciprocatory movements of the follower and band employed in connection with the screw-threaded rod illustrated in Fig. 7, and Fig. 10$^a$ is a horizontal section of one of the friction devices shown in said Fig. 10, looking downward.

Similar letters of reference are employed in each of the above described views to indicate corresponding parts.

In said views, A indicates a railway car and $a$ one of the car-wheel axles, which rotates in the usual form of boxes or bearings $a'$ of the car-wheel truck. By means of any suitable form of gearing and link chains or belts B, which may be of the form illustrated and claimed by us in the Letters-Patent hereinabove mentioned, the rotary motion of said axle $a$ is communicated to a shaft $b$ arranged in suitable bearings $b'$ secured to the bottom of the car A, in any convenient manner. On said shaft $b$ is arranged a suitable pulley or wheel $b^2$, over which passes a belt $b^3$ to a pulley or wheel $c'$ arranged on a shaft $c$, substantially as illustrated in Fig. 4, for driving the intermediately arranged speed mechanism which operates the dynamo and regulates the speed of the latter. The general arrangement and construction of said speed mechanism for finally operating the dynamo, and which mechanism is embodied in a complete machine, are illustrated more especially in Figs. 1, 2, 3 and 5.

To the floor of the car or to any suitable base adapted to be secured to the floor of the car, are secured the frames or supports $d$ and $d'$ on the one side of the said speed mechanism, and on the other side of the said machine are the supports or frames $d^2$ and $d^3$, said supports being provided at their top with the inwardly extending arms $d^4$ and $d^5$, and these are held in position and secured to a connecting plate $d^6$ by means of suitable bolts $d^7$. Arranged between said supports $d$ and $d'$, and $d^2$ and $d^3$, is a suitable base $e$, which may be provided with the feet $e'$, adapted to be secured to the floor of the car by bolts or screws $e^2$, as will be seen from said Fig. 1. Extending up from said base $e$ at the ends thereof are two standards $e^3$ and $e^4$ provided with bearings $e^5$ in which rotates a governor shaft $f$. As will be seen from Figs. 1, 2, 3, 5 and 6, to the one end of said governor shaft is secured a bevel wheel $f'$, and meshing with said bevel wheel are two bevel wheels $c^2$ and $c^3$, which are loosely arranged on sleeves $c^4$ and $c^5$ respectively secured on said shaft $c$ by means of a key $c^6$, as shown in Fig. 8. The ends of each of said sleeves $c^4$ and $c^5$ form ratchet wheels $c^7$ and $c^8$, the ratchet teeth thereof being set in opposite directions, said wheels being provided with spring-actuated pawls $c^9$ and $c^{10}$ respectively, said pawls being set in opposite ways and adapted to engage with the teeth of said ratchet wheels. By this opposite arrangement of the ratchet teeth and the pawls acting in opposite directions, and also, owing to the fact that the bevel wheels $c^2$ and $c^3$ are loosely arranged on said shaft $c$, said governor shaft $f$ will at all times maintain its revolutions in the same direction, whether the car is moving forward or backward, which will cause the dynamo and the several parts of the intermediately arranged mechanism to rotate in one and the same direction. Said shaft $c$, as will be seen more especially from Fig. 4, is arranged to rotate in bearings $e^6$ and $e^7$ and between said bearings and the ratchet wheels $c^7$ and $c^8$ on the shaft $c$ are placed suitable collars or sleeves $c^{11}$ and $c^{12}$ to retain the several parts in their positions on said shaft $c$. As will be seen from Figs. 1, 5 and 6, said governor shaft $f$ extends through the bearings $e^5$ and upon the free end of said shaft, we have arranged a suitable sprocket wheel $f^2$, which consists essentially of an outer ring, preferably provided with suitable sprockets or teeth $f^3$; and within said ring is arranged friction plates $f^4$ preferably provided with recesses or chambers $f^5$ into which extend or project the ends of suitable friction arms $f^6$, as will be clearly seen from Fig. 6ª. Of course it will be evident that any suitable friction clutch may be used. On said shaft $f$ are arranged a stationary collar $g$ and a sliding collar $g'$, with which are pivotally connected the arms $g^2$ provided with governor balls $g^3$. Between said collar $g'$ and a collar $g^4$ secured on said shaft $f$ is a suitable spring $g^5$, which encircles said shaft as shown, and connected with said sleeve or collar $g'$ and sliding in a groove $f^7$ in the shaft $f$ is a connecting bar $h$. At certain rates of speed of the train, said governor balls $g^3$, are in the positions, substantially as indicated in Fig. 6, but as soon as the rate of speed of the train increases, the balls move outwardly, thereby drawing up the collar $g'$ and by means of the connecting bar $h$ and a washer or collar $h'$ connected therewith, two wedge-shaped fingers $h^2$ and $h^3$ projecting from a collar $h^4$ pass forward and cause the arms $f^6$ to move outwardly, whereby said friction plates $f^4$ and $f^5$ are brought into binding contact with the inner surface of said ring or sprocket wheel $f^2$. Said wheel then begins to rotate and by means of a suitable link chain or belt $i$ operates a sprocket wheel or pulley $i'$ secured to the end of a shaft $i^2$ which is arranged in suitable hangers $i^3$ and $i^4$ in the frame-pieces or supports of the machine. On said shaft $i^2$ and a shaft $i^5$ are two reversely arranged conical pulleys $l$ and $l'$ respectively, which are fixed on said parallel shafts, and encircling the lower pulley $l'$ is an endless band $l^2$. As will be seen more especially from Fig. 1 of the drawings, said band $l^2$, which, as has been stated, loosely encircles only one of said pulleys, as the lower pulley $l'$, moves by friction between the very small space left between the two cone-pulleys, and is therefore in constant frictional contact with the two nearest surface edges of the pulleys, whereby, owing to such arrangement of the belt or band $l^2$, the action of said band is more positive and the speed of the one pulley is instantaneously changed. The position of this endless band or belt $l^2$ is regulated by a guide or follower $l^3$ (see Fig. 3) through which it passes, and said follower is actuated by a screw-threaded rod $l^4$ with which it engages and is supported thereon. By this arrangement of the short friction band $l^2$ we have derived this great advantage, that there will be no slipping of the band between the contact surfaces of the pulleys, as is the case, where the belt is arranged to run over, instead of between the cone-pulleys, and we therefore obtain a greater and a positive power, and a machine is the result which is capable of doing the work for which it is intended. Said rod $l^4$ is arranged in suitable bearings on the frame-pieces of the machine, and, as will be seen from Figs. 1, 3, and 10, is operated indirectly from said cone-shaft $i^5$, which in this case is the driven shaft, by means of a very sensitive compound governor M, which in turn is connected by means of a train of gearing N with said screw-threaded rod $l^4$, geared in such manner to give the said rod $l^4$ a much greater velocity than that of the cone-pulley $l'$. This causes the follower $l^3$ to travel with great speed on the said screw-threaded rod $l^4$ while the band travels slowly between the cone-pulleys, and hence said band can not burn but still owing to the great speed of the follower $l^3$ is thereby rendered very sensitive and immediately changes the speed of the lower cone-pulley as the speed of the train varies. It is this action of these parts that causes a uniform speed of the shaft $i^5$. Extending from the one side of the frame of the machine, as will be seen from said Fig. 1, are suitable arms $d^6$ and $d^7$, forming brackets or supports for the governor M. The governor shaft $m$ is rotatively arranged in a pedestal bearing $d^8$ in said arm $d^6$ and gearing with a miter wheel $m'$ on said shaft $m$ is a miter wheel $i^6$ on the cone-shaft $i^5$. Said shaft $m$ has arranged on its upper end a suitable governor $m^2$ which causes, as the speed of the shaft $m$ increases or decreases, a reciprocatory movement of a slide $m^3$ on said shaft $m$. On said shaft $m$ are loosely arranged two bevel wheels $m^4$ and $m^5$, each of which is provided with a suitable friction device $o$ and $o'$ respectively. In said device $o$ connected with said bevel wheels $m^4$ are the friction clutches $o^2$, and as the speed of the governor is decreased, the spring $m^6$ causes the downward movement of a rod $m^7$ attached to said slide $m^3$ and hence the operative engagement of said bevel wheel $m^5$ with a large wheel $n$ of the said gear mechanism N, which causes the said rod $l^4$ to move in one direction, while, when the governor balls move outwardly, as the speed increases, the friction device $o'$ becomes disconnected with the bevel wheel $m^5$ and brings said bevel wheel $m^4$ into operative engagement with said gear wheel $n$, which causes said rod $l^4$ to rotate in the opposite direction, as will be clearly understood from an inspection of Fig. 10. In order to prevent the accidental displacement of said clutches $o^2$, they are preferably arranged to slide on projections $o^3$ formed on the inner surfaces of said friction devices $o$ and $o'$, as will be seen from Fig. 10$^a$. The miter wheel $n$ is connected with a large gear wheel $n'$ which rotates on an axial pin $n^3$ in the arm $d^7$, and which in turn meshes with a pinion $n^2$ of a greatly reduced diameter, whereby the screw-threaded rod $l^4$ receives a greatly increased speed. Thus it will be seen, that the continuous rotary motion of the shaft $i^5$, by means of this system of gearing and the action of the compound governor M will cause the said screw-threaded rod $l^4$ to rotate intermittently in opposite directions according to the variations of the speed of the governor and the cone-pulley to which it is geared. At the same time, the intermittent reciprocations of the follower $l^3$ are produced along the rod $l^4$ and the governor M having been previously adjusted for a certain speed, any variations more or less will be counteracted by said governor, and the speed of the shaft $i^5$ is rendered constant, irrespective of the variations of the several other shafts employed in the herein described machine. The construction and operation of said follower $l^3$ will be evident from an inspection of Fig. 7, the follower passing backward and forward on said screw-threaded rod $l^4$, according to the change of revolution of the shaft as the speed varies. As will be seen from said figure, said follower is provided with one blind eye $l^6$ and a screw-threaded eye $l^7$, by means of which it moves up and down on said screw-threaded rod. When the follower $l^3$ has traversed the entire length of the screw on the rod $l^4$ and the rotary movement of said rod is suddenly reversed, suitable springs $p$ or $p'$ again force the eye $l^7$ upon the screw-threaded portion of the rod, as will be clearly understood.

As will be seen from Figs. 1, 2, and 3, we have arranged on the free end of the shaft $i^5$, a sprocket wheel or pulley $r$ over which passes a link chain or belt $r'$ which produces a rotary motion of a wheel $r^2$ on the armature shaft $s'$ of a suitable dynamo $s$. Said dynamo is preferably placed on top of the frame of the speed regulator, but it can be placed in any other suitable position in the car, as will be evident. From said dynamo extend the circuit wires $s^2$ and $s^3$ which lead to the lamps within the car or to a storage battery.

The operation of the mechanism is briefly as follows:—When the train starts, the axle $a$ causes the revolutions of the shaft $b$, which in turn causes the operation of the gear shaft $c$. All these shafts are adapted to revolve in opposite directions according to the forward or backward movements of the train, but said bevel wheels $c^2$ and $c^3$ cause the shaft $f$ to rotate at all times in the same direction. The governor on this shaft is adjusted for a certain speed, that its sprocketed friction wheel connected with the upper cone-pulley shaft will not become operated until the train exceeds this speed, when the cone-pulleys will begin to operate and by means of the rod $l^4$ and the governor connected therewith, finally bringing the varying speed of the car down to a uniform speed of the dynamo, from which the generated current can be passed into the lamps in the car or into storage batteries. The essential feature of our invention, therefore, is the arrangement and construction of the novel form of machine herein described, whereby the dynamo is successfully connected with the car-wheel axle, to maintain an equal power and a uniform speed of the dynamo regardless of the speed at which the train may be traveling, and at all times to cause the dynamo to run in the same direction, whether the car is moving forward or backward.

We do not wish to be understood as limiting ourselves to the exact arrangement and construction of the several parts of mechanism comprised herein, for certain changes may be made in the details of construction without departing from the scope of our present invention.

Having thus described our invention, what we claim is—

1. The herein described speed regulating device, comprising therein, a main shaft, a cone-shaped pulley thereon, a driven shaft and a reversely arranged cone-pulley thereon, an endless band arranged between said pulleys, and operating by friction with said pulleys, means, whereby said band is caused to travel lengthwise of the pulleys, in either direction, a governor connected with said driven shaft, an automatically operated clutch connected with said governor and said means for causing the said band to travel lengthside of the cone-pulleys, substantially as and for the purposes set forth.

2. In the herein described means for transmitting power from a car-wheel axle to a dynamo within the car, a speed regulating device, consisting essentially of a main shaft, a cone-pulley thereon, a driven shaft, and a reversely arranged cone-pulley thereon, an endless band arranged between said pulleys, means, whereby said band is caused to travel lengthwise of the pulleys in either direction, a governor connected with said driven shaft, an automatically operated clutch connected with said governor, and a train of gearing connected with said governor and said means for causing the band to travel lengthwise of the cone-pulleys, and means connecting the other of said pulley shafts with the car-wheel axle, substantially as and for the purposes set forth.

3. In the herein described means for transmitting power from a car-wheel axle to a dynamo within the car, an automatic speed regulator, comprising therein, a suitable frame and base, two reversely arranged cone-pulleys adapted to rotate in bearings in said frame, a friction clutch geared with and operating one of said cone-pulleys, an endless band arranged between said pulleys, means, whereby said band is caused to travel lengthwise of the pulleys, and means connecting said friction clutch with the car-wheel axle, substantially as and for the purposes set forth.

4. In the herein described means for transmitting power from a car-wheel axle to a dynamo within the car, an automatic speed regulator, comprising therein, a suitable frame and a base, two reversely arranged cone-pulleys adapted to rotate in bearings in said frame, a friction clutch geared with and operating one of said cone-pulleys, a governor arranged on the same shaft with said friction clutch and regulating the action of the same, an endless band arranged between said cone-pulleys, means, whereby said band is caused to travel lengthwise of the pulleys, and means connecting said friction clutch and its governor with the car-wheel axle, substantially as and for the purposes set forth.

In testimony that we claim the invention set forth above we have hereunto set our hands this 26th day of April, 1893.

MORRIS MOSKOWITZ.
SAMUEL YOUNG.

Witnesses:
FREDK. C. FRAENTZEL,
WM. H. CAMFIELD, Jr.